(12) United States Patent
Liu et al.

(10) Patent No.: US 11,468,715 B2
(45) Date of Patent: Oct. 11, 2022

(54) CLOUD-BASED VEHICLE FAULT DIAGNOSIS METHOD, APPARATUS, AND SYSTEM

(71) Applicant: Huawei Technologies Co., Ltd., Shenzhen (CN)

(72) Inventors: Zhentong Liu, Shanghai (CN); Yongsheng Zhang, Shanghai (CN); Wei Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 571 days.

(21) Appl. No.: 16/510,289

(22) Filed: Jul. 12, 2019

(65) Prior Publication Data
US 2019/0333291 A1 Oct. 31, 2019

Related U.S. Application Data

(63) Continuation of application No. PCT/CN2017/097124, filed on Aug. 11, 2017.

(30) Foreign Application Priority Data

Jan. 13, 2017 (CN) .......................... 201710025101.8

(51) Int. Cl.
*G07C 5/00* (2006.01)
*G01M 17/007* (2006.01)
(Continued)

(52) U.S. Cl.
CPC ........... *G07C 5/008* (2013.01); *G01M 17/007* (2013.01); *G07C 5/02* (2013.01); *G07C 5/0841* (2013.01); *H04L 67/10* (2013.01)

(58) Field of Classification Search
CPC ........ G07C 5/008; G07C 5/02; G07C 5/0841; G01M 17/007; H04L 67/10; G06F 16/00;
(Continued)

(56) References Cited

U.S. PATENT DOCUMENTS

2005/0262394 A1 11/2005 Yasukawa et al.
2011/0238258 A1 9/2011 Singh et al.
(Continued)

FOREIGN PATENT DOCUMENTS

CN 1987697 A 6/2007
CN 102752360 A 10/2012
(Continued)

OTHER PUBLICATIONS

Yan-Wei, C., et al., "Fault diagnosis of a mine hoist using PGA and SVM techniques," XP025430591, Journal of China University of Mining and Technology, vol. 18, No. 3, Sep. 1, 2008, pp. 327-331.
(Continued)

*Primary Examiner* — Krishnan Ramesh
(74) *Attorney, Agent, or Firm* — Conley Rose, P.C.

(57) ABSTRACT

A cloud-based vehicle fault diagnosis method includes receiving monitoring data uploaded by a vehicle; extracting eigenvectors of the monitoring data from the monitoring data; storing the eigenvectors of the monitoring data based on classification using, as a label, a part or a functional system of the vehicle from which the monitoring data comes; and performing, based on a support vector machine algorithm, fault diagnosis in parallel on the eigenvectors stored based on the classification.

19 Claims, 9 Drawing Sheets

(51) Int. Cl.
  G07C 5/02 (2006.01)
  G07C 5/08 (2006.01)
  H04L 67/10 (2022.01)

(58) Field of Classification Search
  CPC .. G06F 16/24568; G06F 16/285; G06F 16/22;
       G06K 9/62; G06K 9/6269; B60W
       50/0205; B60W 50/14; B60Y 2306/15
  USPC ...................................................... 701/31.5
  See application file for complete search history.

(56) References Cited

U.S. PATENT DOCUMENTS

| | | | |
|---|---|---|---|
| 2016/0035152 A1* | 2/2016 | Kargupta | G06F 16/955 701/31.5 |
| 2018/0018590 A1* | 1/2018 | Szeto | G06N 20/10 |
| 2018/0248766 A1* | 8/2018 | Ezra | H04L 12/40013 |

FOREIGN PATENT DOCUMENTS

| | | |
|---|---|---|
| CN | 103455026 A | 12/2013 |
| CN | 104021238 A | 9/2014 |
| CN | 104133467 A | 11/2014 |
| CN | 105095566 A | 11/2015 |
| CN | 105137963 A | 12/2015 |
| CN | 105510051 A | 4/2016 |
| CN | 105867351 A | 8/2016 |
| CN | 106054867 A | 10/2016 |
| CN | 106327344 A | 1/2017 |
| JP | 2001296915 A | 10/2001 |
| JP | 2005309077 A | 11/2005 |
| JP | 2006315813 A | 11/2006 |
| JP | 2007161044 A | 6/2007 |
| JP | 2014234113 A | 12/2014 |
| KR | 20140143486 A | 12/2014 |

OTHER PUBLICATIONS

Niu, Q., et al., "Fault Condition Recognition of mine hoist Combining Kernel PCA and SVM," XP031127181, Proceedings of the IEEE International Conference on Integration Technology, Mar. 20-24, 2007, pp. 643-647.

Jiang L., et al., "Research Recognition of Aircraft Engine Abnormal State," XP033178889, The 27th Chinese Control and Control and Decision Conference, May 23, 2015, pp. 4625-4630.
Foreign Communication From A Counterpart Application, European Application No. 17890940.4, Extended European Search Report dated Oct. 16, 2019, 9 pages.
Arghya Bhattacharya et al.,"Edge-enhanced bi-dimensional empirical mode decomposition-based emotion recognition using fusion of feature set",Soft Comput,Published online: Nov. 8, 2016,total 16 pages.
Machine Translation and Abstract of Chinese Publication No. CN1987697, Jun. 27, 2007, 13 pages.
Machine Translation and Abstract of Chinese Publication No. CN102752360, Oct. 24, 2012, 13 pages.
Machine Translation and Abstract of Chinese Publication No. CN103455026, Dec. 18, 2013, 14 pages.
Machine Translation and Abstract of Chinese Publication No. CN104021238, Sep. 3, 2014, 10 pages.
Machine Translation and Abstract of Chinese Publication No. CN104133467, Nov. 5, 2014, 7 pages.
Machine Translation and Abstract of Chinese Publication No. CN105095566, Nov. 25, 2015, 24 pages.
Machine Translation and Abstract of Chinese Publication No. CN105137963, Dec. 9, 2015, 9 pages.
Machine Translation and Abstract of Chinese Publication No. CN105510051, Apr. 20, 2016, 6 pages.
Machine Translation and Abstract of Chinese Publication No. CN105867351, Aug. 17, 2016, 9 pages.
Machine Translation and Abstract of Chinese Publication No. CN106054867, Oct. 26, 2016, 7 pages.
Machine Translation and Abstract of Chinese Publication No. CN106327344, Jan. 11, 2017, 12 pages.
Machine Translation and Abstract of Japanese Publication No. JP2001296915, Oct. 26, 2001, 13 pages.
Foreign Communication From A Counterpart Application, Chinese Application No. 201710025101.8, Chinese Office Action dated Jul. 10, 2019, 5 pages.
Foreign Communication From A Counterpart Application, Chinese Application No. 201710025101.8, Search Report dated dated May 6, 2019, 3 pages.
Foreign Communication From A Counterpart Application, PCT Application No. PCT/CN2017/097124, English Translation of International Search Report dated Nov. 19, 2017, 3 pages.
Foreign Communication From A Counterpart Application, PCT Application No. PCT/CN2017/097124, English Translation of Written Opinion dated Nov. 19, 2017, 4 pages.

* cited by examiner

CLOUD-BASED VEHICLE FAULT DIAGNOSIS METHOD, APPARATUS, AND SYSTEM

CROSS-REFERENCE TO RELATED APPLICATIONS

This application is a continuation application of International Patent Application No. PCT/CN2017/097124, filed on Aug. 11, 2017, which claims priority to Chinese Patent Application 201710025101.8, filed on Jan. 13, 2017, the disclosures of the aforementioned applications are hereby incorporated by reference in their entireties.

TECHNICAL FIELD

The present disclosure relates to the field of fault diagnosis, and in particular, to a cloud-based vehicle fault diagnosis method, apparatus, and system.

BACKGROUND

Automobiles have become a daily means of transportation commonly selected by people. With development of economy, science, and technology, electric automobiles are increasingly popular, intelligent and interconnected automobiles begin to appear, and an electronic technology, an automatic technology, and a computer technology are increasingly used in design and production industries of automobiles. On one hand, the automobiles are increasingly automatic. On the other hand, a higher requirement is proposed for maintenance and monitoring of the automobiles. Due to application of computer control systems, structures of the automobiles become increasingly complex, increasing difficulty in fault diagnosis of the automobiles.

Fault diagnosis of the automobiles is associated with safety of both vehicles and drivers, and is a measure necessary for ensuring normal driving of the automobiles. Existing fault diagnosis technologies are mainly a qualitative analysis method (for example, fault diagnosis based on an expert system) and a quantitative analysis method (for example, fault diagnosis based on a parsing model and data-driven fault diagnosis). The data-driven fault diagnosis often uses a fault diagnosis technology based on a machine learning algorithm. Qualitative analysis fault diagnosis can implement only offline diagnosis, and diagnosis accuracy of a relatively minor fault is relatively low. The fault diagnosis based on the parsing model and the fault diagnosis based on the machine learning algorithm can both accurately diagnose a relatively small fault occurring in a system. The fault diagnosis based on the parsing model has relatively good real-time performance, but a parsing model can hardly be constructed for a relatively complex and relatively large non-linear system. Although the fault diagnosis technology based on the machine learning algorithm can diagnose and manage various faults, it involves a relatively large amount of computing and requires a relatively long period of time. Therefore, an existing single-chip microcomputer cannot support online use of the fault diagnosis technology. As cloud computing develops and matures, the cloud computing can help resolve problems of a large computing amount and a long consumed time of the fault diagnosis based on the machine learning algorithm.

Other approaches provide a cloud computing-based automobile fault detection system. The system can resolve, based on cloud computing, a minor problem such as insufficient compute power of a single-chip microcomputer, an expensive detection device, or inconvenience of being mounted on an automobile. However, the system has simple logic, and does not provide a technical solution about how to accurately diagnose a fault. In addition, fault diagnosis accuracy is low, and vehicle safety can hardly be ensured.

SUMMARY

Embodiments of the present disclosure provide a cloud-based vehicle fault diagnosis method, system, and apparatus, to improve fault diagnosis accuracy and reduce a diagnosis time.

A first aspect provides a cloud-based vehicle fault diagnosis method. The method includes receiving monitoring data uploaded by a vehicle, where the monitoring data is data of a working status of a part or a functional system of the vehicle that is monitored by the vehicle using a monitoring device, the part is an accessory included in the vehicle, for example, a brake, a transmission, a compressor, a tire pressure monitor, or a water pump, and the functional system is an entirety that includes a plurality of components and that is configured to implement a particular function, for example, a battery management system, a braking safety system, or a power system; extracting eigenvectors of the monitoring data from the monitoring data, where the extracted eigenvectors are a set of numbers representing the monitoring data, for example, the eigenvectors are a set of average values or variance values that are obtained by performing average or variance calculation on the monitoring data and that correspond to original data of the monitoring data, and optionally, the set of numbers is represented as $\{A, B, C, D, \ldots, Z\}$; storing the eigenvectors of the monitoring data based on classification using, as a label, the part or the functional system of the vehicle from which the monitoring data comes; and performing, based on a support vector machine algorithm, fault diagnosis in parallel on the eigenvectors stored based on the classification.

With reference to the first aspect, in a first possible implementation of the first aspect, before the extracting eigenvectors of the monitoring data from the monitoring data, the method further includes parsing the received monitoring data, to obtain parsed monitoring data; and storing the parsed monitoring data based on classification using, as a label, the part or the functional system of the vehicle from which the monitoring data comes, where the label for storing the parsed monitoring data based on the classification corresponds to the label for storing the eigenvectors based on the classification; and the extracting eigenvectors of the monitoring data from the monitoring data includes extracting eigenvectors of the parsed monitoring data from the parsed monitoring data.

With reference to the first possible implementation of the first aspect, in a second possible implementation of the first aspect, the method further includes periodically deleting previous monitoring data of a part or a functional system, where the data and recently extracted data have same eigenvectors.

A second aspect provides a cloud-based vehicle fault diagnosis apparatus. The cloud-based vehicle fault diagnosis apparatus includes a monitoring data receiving module, a data preprocessing module, a feature database, and a fault diagnosis module. The monitoring data receiving module is configured to receive monitoring data uploaded by a vehicle, where the monitoring data is data of a working status of a part or a functional system that is monitored by the vehicle. The data preprocessing module is configured to extract eigenvectors of the monitoring data from the monitoring data received by the monitoring data receiving module, where the eigenvectors are a set of numbers representing the monitoring data. The feature database is configured to store, based on classification using, as a label, the part or the functional system of the vehicle from which the monitoring data comes, the eigenvectors extracted by the data preprocessing module. The fault diagnosis module is configured to perform, based on a support vector machine algorithm, fault diagnosis in parallel on the eigenvectors stored by the feature database based on the classification.

With reference to the second aspect, in a first possible implementation of the second aspect, the apparatus further includes a central database. The central database is configured to parse the monitoring data received by the monitoring data receiving module, to obtain parsed monitoring data; and store the parsed monitoring data based on classification using, as a label, the part or the functional system of the vehicle from which the monitoring data comes, where the label for storing the parsed monitoring data based on the classification corresponds to the label for storing the eigenvectors based on the classification. The data preprocessing module is configured to extract eigenvectors of the parsed monitoring data from the monitoring data parsed by the central database.

With reference to the second aspect or the first possible implementation of the second aspect, in a second possible implementation of the second aspect, the feature database is further configured to periodically delete previously stored eigenvectors same as a part or a functional system from which monitoring data represented by recently extracted eigenvectors comes.

With reference to the second possible implementation of the second aspect, in a third possible implementation of the second aspect, the central database deletes monitoring data that corresponds to the eigenvectors deleted by the feature database.

A third aspect provides a cloud-based vehicle fault diagnosis system. The system includes the apparatus according to the second aspect, the first implementation of the second aspect, or the second implementation of the second aspect and a vehicle. The vehicle uploads data monitored by the vehicle to the apparatus according to the second aspect, the first implementation of the second aspect, or the second implementation of the second aspect. The apparatus according to the second aspect, the first implementation of the second aspect, or the second implementation of the second aspect performs fault diagnosis based on the received data.

According to the embodiments of the present disclosure, eigenvectors of monitoring data from different parts or functional systems are stored based on classification and based on the support vector machine algorithm, and fault diagnosis is performed in parallel on the eigenvectors stored based on the classification. A diagnosis time can be shortened, and different data can be prevented from affecting each other during data transfer, thereby improving fault diagnosis accuracy.

DESCRIPTION OF EMBODIMENTS

The following describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Acronyms and definitions of terms possibly related to the embodiments of the present disclosure are as follows.

Figure 1:
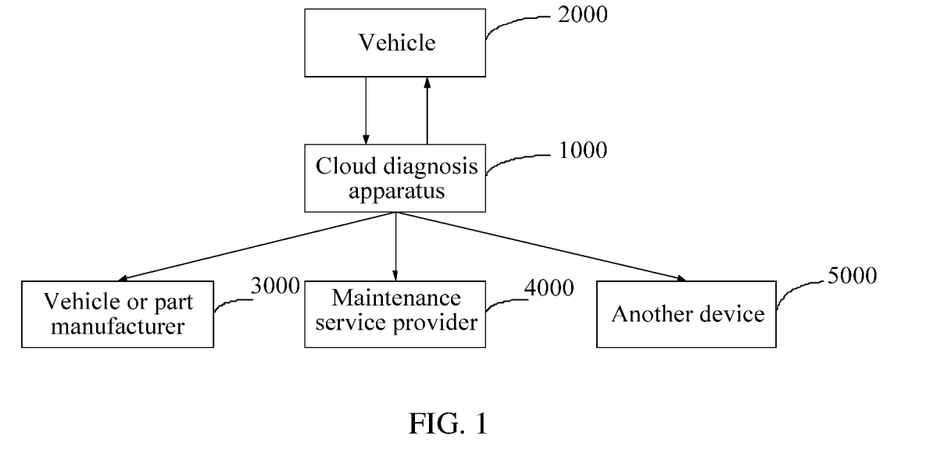
FIG. 1 is a schematic diagram of a cloud-based fault diagnosis system according to an embodiment of the present disclosure.

ADAS Advanced Driver Assistant System
VCU Vehicle Control Unit
OBC On Board Charger
SVM Support Vector Machine
GA Genetic Algorithm
PSO Particle Swarm Optimization
DDAG Decision Directed Acyclic Graph The embodiments of the present disclosure provide a cloud-based vehicle fault diagnosis system that may be configured to diagnose a fault of a vehicle in real time or/and online; collect statistics on fault data of a functional system/part of the vehicle; and so on. As shown in FIG. 1, the system includes the following components. A cloud diagnosis apparatus 1000, a vehicle 2000, a vehicle or part manufacturer 3000, a maintenance service provider 4000, and another device 5000.

The cloud diagnosis apparatus 1000 exchanges data with the vehicle 2000, the vehicle or part manufacturer 3000, the maintenance service provider 4000, and another device 5000 using a wireless communications technology. Optionally, the wireless communications technology is not limited in the system, and may be one or more of wireless communications technologies in any protocol. The cloud diagnosis apparatus 1000 may diagnose and position, in real time based on monitoring data uploaded by the vehicle 2000, a fault occurring in the vehicle, and manage and collect statistics on fault data. Further, the cloud diagnosis apparatus 1000 may send the fault data that is processed or on which statistics is collected to the corresponding vehicle 2000, vehicle or part manufacturer 3000, maintenance service provider 4000, or another device 5000. For example, if a part manufacturer A intends to know a fault situation of a part A produced by the part manufacturer A, the cloud diagnosis apparatus 1000 may send fault data of the part A obtained through statistics collection to the part manufacturer A, where the fault data of the part A includes, but not limited to, a quantity of vehicles in which the part A has a fault, a quantity of faults occurring in the part A of a vehicle, and the like. For another example, if a vehicle B intends to know a fault situation during real-time running of the vehicle B, the cloud diagnosis apparatus 1000 may send, to the vehicle B, fault data of the vehicle B that is obtained based on monitored data uploaded by the vehicle B in real time, where the fault data of the vehicle B includes, but not limited to, a safety coefficient of the vehicle B, a fault reminder of a part, and the like.

The vehicle 2000 is configured to indicate one or more automobiles interconnected to the cloud diagnosis apparatus 1000 using the wireless communications technology, and does not particularly point to a vehicle during driving. The vehicle 2000 is equipped with a monitoring sensing apparatus configured to monitor running data of the vehicle or running data of a part, and may upload related monitored data to the cloud diagnosis apparatus 1000 based on a fault diagnosis requirement or instruction setting. The cloud diagnosis apparatus 1000 further processes the monitoring data uploaded by the vehicle 2000.

The vehicle or part manufacturer 3000, the maintenance service provider 4000, and the other device 5000 are not necessary components of the system, and obtain/receive, based on respective requirements, fault related data from the cloud diagnosis apparatus 1000, to analyze a probability and a frequency of occurrence of a fault, an effect on a vehicle/functional system/part, and the like.

In this embodiment of the present disclosure, a vehicle fault diagnosis link is moved to a cloud fault diagnosis apparatus, such that a limited computing capability of a single-chip microcomputer of a single vehicle can be overcome, and fault diagnosis accuracy can be improved; and many faults of many vehicles can be uniformly managed based on cloud, and obtained data can be shared with a vehicle/part manufacturer, a maintenance service provider, and another device (for example, a third-party monitoring device), to clear a fault from a source, improve safety of a vehicle/part, and ensure driving safety of the vehicle. It should be noted that the cloud-based diagnosis system is not limited to diagnosis and management of a fault of a vehicle/part, and is also applicable to diagnosis and management of faults of, for example, a ship, an airplane, a train, and an unmanned aerial vehicle.

Figure 2:
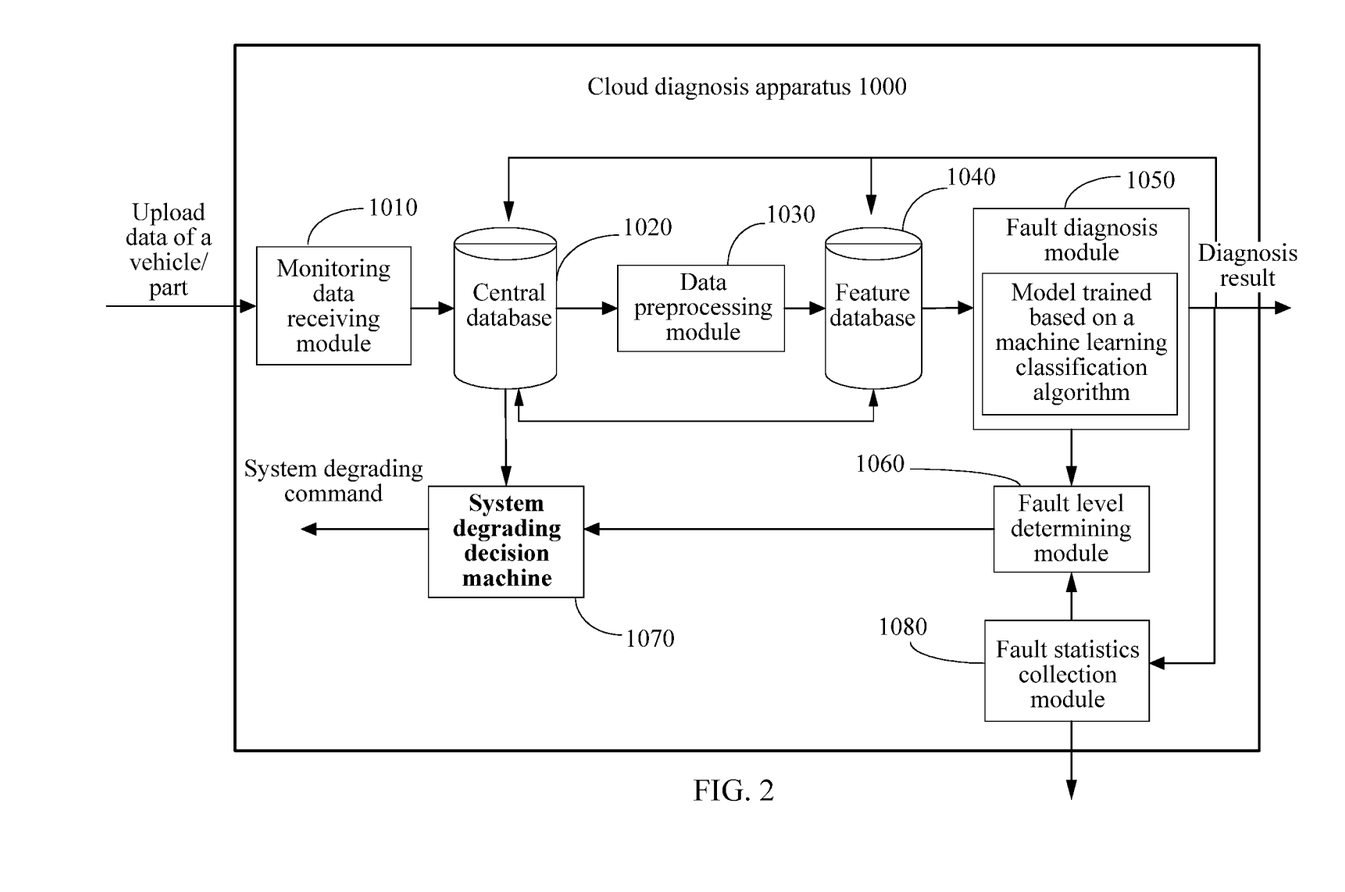
FIG. 2 is a schematic diagram of a cloud diagnosis apparatus according to an embodiment of the present disclosure.

An embodiment of the present disclosure provides a cloud diagnosis apparatus. As shown in FIG. 2, the apparatus 1000 includes a monitoring data receiving module 1010, a central database 1020, a data preprocessing module 1030, a feature database 1040, a fault diagnosis module 1050, a fault level determining module 1060, a system degrading decision machine 1070, and a fault statistics collection module 1080.

The monitoring data receiving module 1010 is configured to receive monitoring data uploaded by a vehicle, where the monitoring data is data of a working status of a part or a functional system that is monitored by the vehicle. Optionally, the monitoring data is related data of a working status of a vehicle, a part, or a functional system that is monitored by the vehicle.

The central database 1020 is configured to parse the monitoring data received by the monitoring data receiving module 1010, to obtain parsed monitoring data, and parse a data packet uploaded by the vehicle, and input parsed data into the data preprocessing module 1030. Optionally, the central database is further configured to store the parsed monitoring data based on classification using, as a label, the part or the functional system from which the monitoring data comes, such that a relatively complete database related to the monitoring data can be established. The database may be configured to subsequently analyze an effect of occurrence of a fault on a lifetime of a vehicle/part, or configured to improve a fault diagnosis system.

Figure 3:
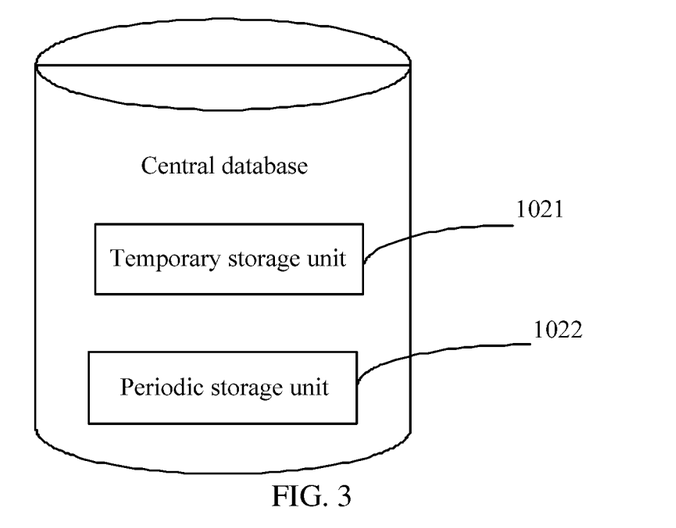
FIG. 3 is a schematic diagram of a central database according to an embodiment of the present disclosure.
Figure 4:
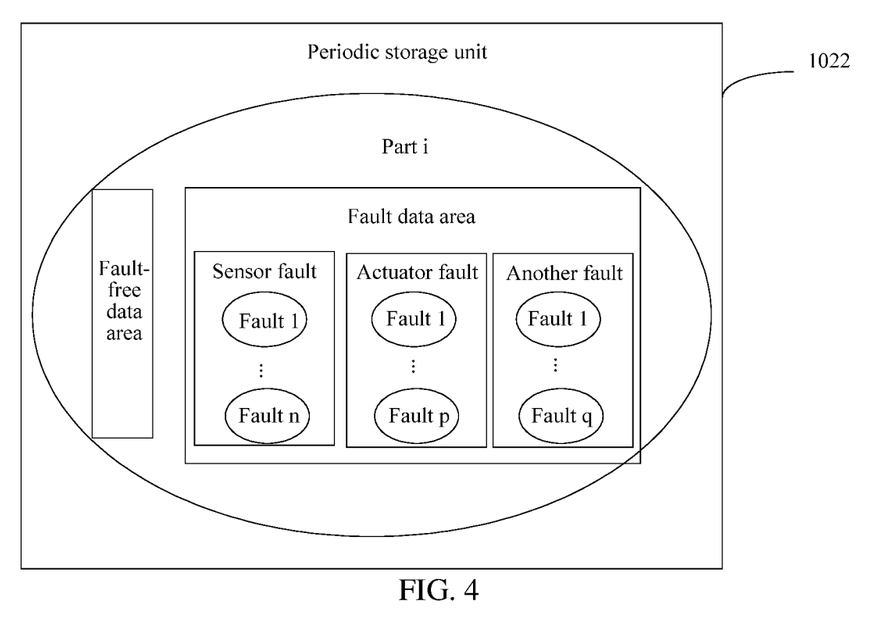
FIG. 4 is a schematic diagram of a periodic storage unit of a central database according to an embodiment of the present disclosure.

Further, as shown in FIG. 3, the central database 1020 includes a temporary storage unit 1021 and a periodic storage unit 1022. Optionally, the temporary storage unit 1021 and the periodic storage unit 1022 are structurally stored and managed based on classification of parts (a part 1, a part 2, . . . , a part n). The temporary storage unit 1021 is configured to temporarily store real-time data uploaded by the vehicle. The periodic storage unit 1022 is configured to store data transferred, using a diagnosis result output by the fault diagnosis module 1050 as a fault label, from the real-time data stored in the temporary storage unit 1021. As shown in FIG. 4, a part i is used as an example for describing structural storage and management of the periodic storage unit 1022 based on classification. The part i has a relatively independent storage area. The storage area is divided into a fault-free data area and a fault data area. The fault data area may be further subdivided into sensor-type data, actuator-type fault data, or other fault data. Each type of fault may be further divided in detail, from a fault 1 to a fault n. For example, sensor fault-type data may be divided into current sensor fault data, voltage sensor fault data, temperature sensor fault data, pressure sensor fault data, and the like. Optionally, to save storage space, the periodic storage unit 1022 may periodically clean the stored data (for example, every week, every month, or every year).

The data preprocessing module 1030 is configured to extract eigenvectors from the monitoring data (which is also referred to as original data) input by the central database 1020 and reduce a dimension of the eigenvectors, to reduce a data volume and extract an effective data eigenvector, such that a fault diagnosis time can be shortened and fault diagnosis accuracy can be improved. The eigenvectors are a set of numbers representing the monitoring data. Optionally, average or variance calculation is performed on the monitoring data, to obtain average values or variance values. A set of the average values or the variance values that corresponds to the monitoring data may be considered as a set of numbers. Optionally, a set of numbers may be represented as $\{A, B, C, D, \ldots, Z\}$.

Figure 5:
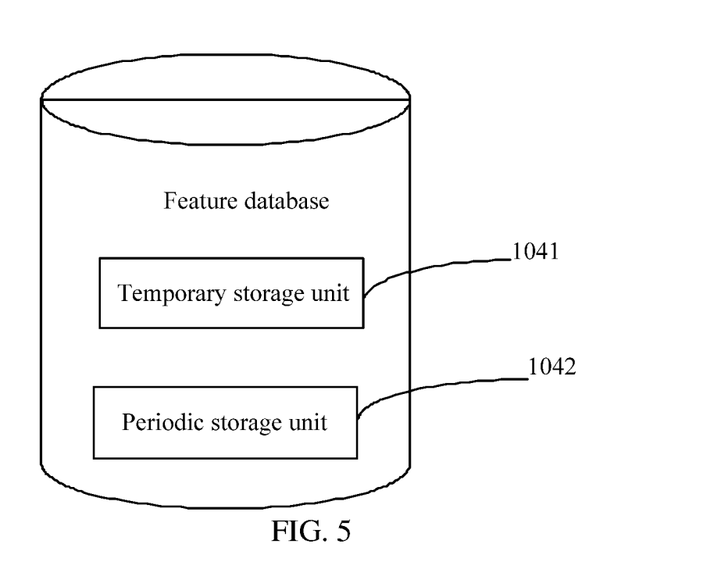
FIG. 5 is a schematic diagram of a feature database according to an embodiment of the present disclosure.
Figure 6:
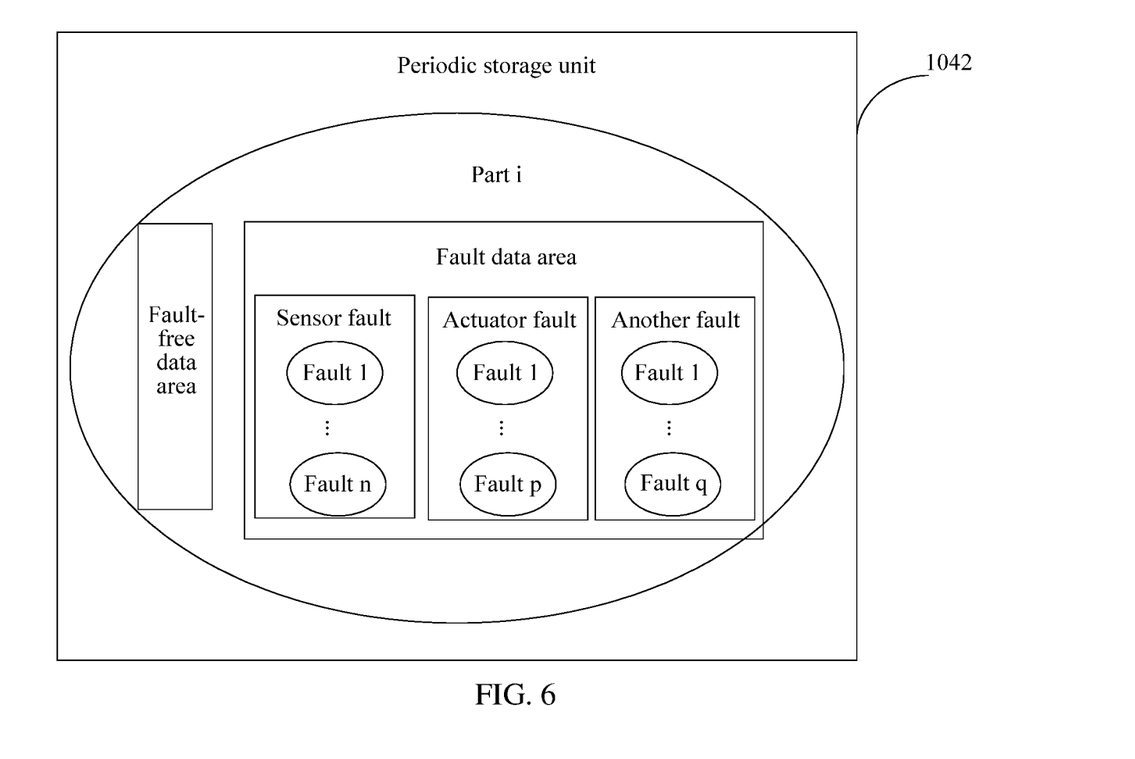
FIG. 6 is a schematic diagram of a periodic storage unit of a feature database according to an embodiment of the present disclosure.

The feature database 1040 is configured to store eigenvectors obtained after processing of the data preprocessing module. Further, as shown in FIG. 5, the feature database 1040 includes a temporary storage unit 1041 and a periodic storage unit 1042. Storage and management of the feature database 1040 is similar to the structural storage and management of the central database 1020 based on the classification, and is also structural storage and management performed based on classification of parts and using the diagnosis result output by the fault diagnosis module 1050 as a label. As shown in FIG. 6, for a detailed description, refer to the structural storage and management of the central database 1020 based on the classification. It should be noted that eigenvector data stored in the feature database 1040 is in a one-to-one correspondence with real-time data (which is also referred to as original data) stored in the central database. Optionally, the eigenvector data stored in the feature database 1040 is periodically cleaned. Principles of the periodic cleaning are provided. (1) only a newest eigenvector needs to be reserved for similar eigenvectors; and (2)

correspondingly, the periodic storage unit 1022 of the central database 1020 needs to reserve only real-time data (which is also referred to as original data) that corresponds to the eigenvector reserved in the feature database 1040.

The fault diagnosis module 1050 is configured to perform, based on a machine learning algorithm, fault diagnosis in parallel on the eigenvectors stored based on the classification. Optionally, the machine learning algorithm used by the fault diagnosis module 1050 is a support vector machine algorithm based on a DDAG. Fault diagnosis is described in the following embodiments, and details are not described herein again.

The fault level determining module 1060 is configured to divide levels for the fault diagnosis result output by the fault diagnosis module 1050. Optionally, the levels are divided into a level-1 fault (which is the most severe), a level-2 fault, a level-3 fault, . . . ; optionally, the levels are divided into a severe fault, a moderate fault, and a general fault.

The system degrading decision machine 1070 is configured to make a decision based on the fault level determined by the fault level determining module 1060 or/and after related data of the fault diagnosis result is input into a model, and notify, using a corresponding danger warning signal, a fault exceeding an expected safety state or affecting a vehicle safety state to a vehicle in which the fault occurs. For example, if the system degrading decision machine 1070 considers, based on related data of a fault diagnosis result of a brake system, that a fault occurring in the brake system has exceeded an expected safety state, the system degrading decision machine 1070 reminds, using a danger warning signal, a vehicle in which the fault occurs, and further requests the vehicle to park while safety is ensured and reminds the vehicle to be maintained as soon as possible.

The fault statistics collection module 1080 is configured to receive the fault diagnosis result output by the fault level determining module 1060, and perform partition management and collect statistics based on a part/system. Further, the fault statistics collection module 1080 is configured to perform one or more of the following, but not limited to the following examples. Collect statistics on a probability of occurrence of a fault of each part, collect statistics on a probability of occurrence of each type of fault in each part, collect statistics on a probability of occurrence of a particular fault in each part, collect statistics on a probability of occurrence of different levels of faults in all parts, and the like. Optionally, a statistics period may be any time period, for example, one year, three months, one month, n weeks, and n days. Optionally, the fault statistics collection module 1080 is configured to send a fault statistics result to a corresponding vehicle or part manufacturer, maintenance service provider, and another device.

The cloud-based vehicle fault diagnosis apparatus provided in this embodiment of the present disclosure can perform fault diagnosis in parallel, based on the support vector machine algorithm, on eigenvectors extracted from monitoring data of different parts or functional systems. A diagnosis time can be shortened, and different data can be prevented from affecting each other during data transfer, thereby improving fault diagnosis accuracy.

Figure 7:
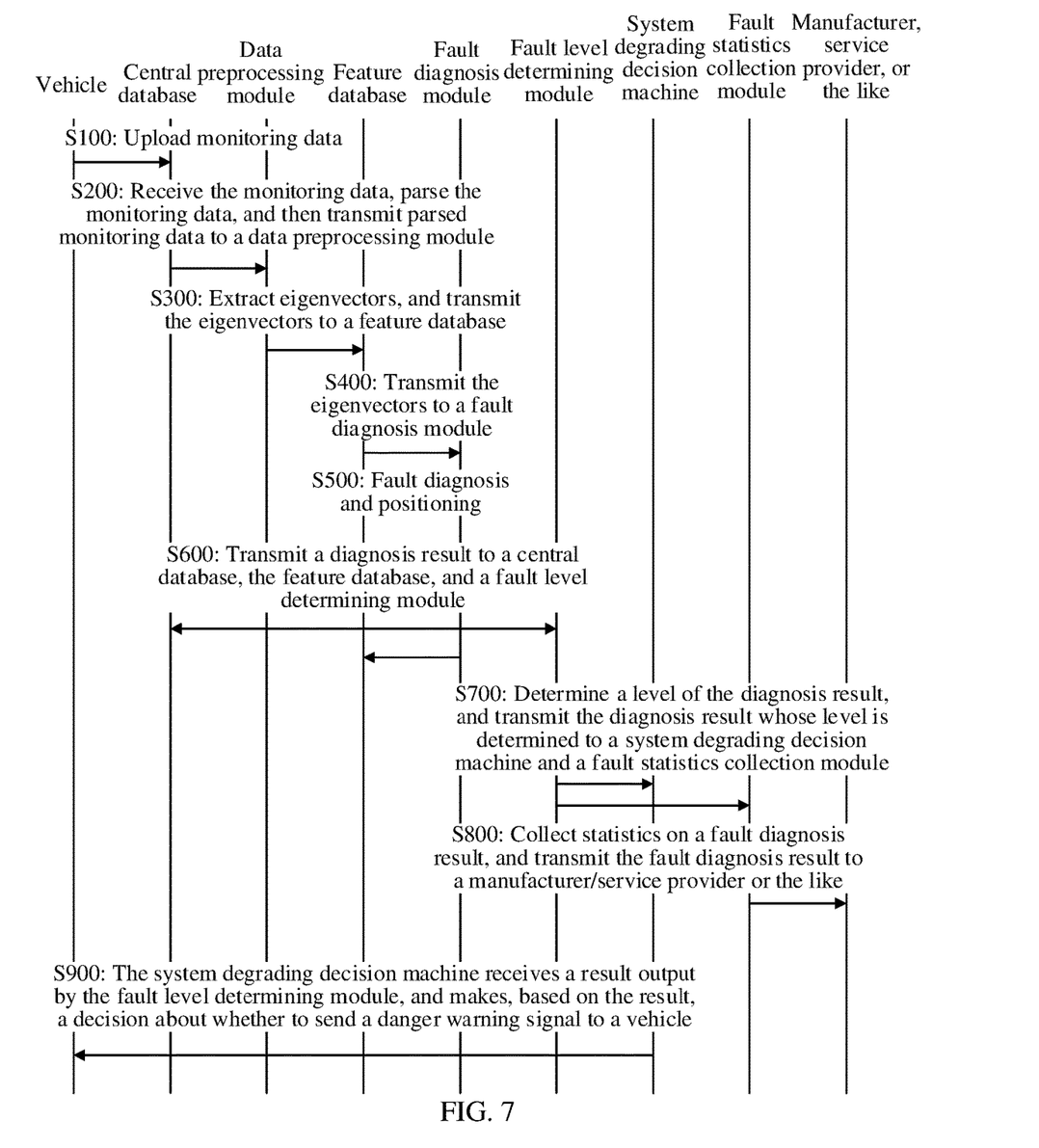
FIG. 7 is a flowchart of a cloud-based fault diagnosis method according to an embodiment of the present disclosure.

An embodiment of the present disclosure provides a cloud-based vehicle fault diagnosis method. As shown in FIG. 7, steps of the method are as follows.

S100: A vehicle uploads monitored monitoring data of a functional system/part to a cloud diagnosis apparatus/system. Optionally, the vehicle directly uploads the monitoring data to a central database. Optionally, the vehicle packs the monitored data in a form of a data packet and uploads the data to the central database. Optionally, the vehicle directly uploads the monitored monitoring data of the functional system/part to a data preprocessing module.

S200: The central database receives the monitoring data uploaded by the vehicle, parses the monitoring data, and then transmits parsed monitoring data to the data preprocessing module. Optionally, the central database further structurally stores and manages the received or parsed monitoring data based on classification. For details, refer to the descriptions of the foregoing embodiments, and details are not described herein again.

S300: The data preprocessing module receives the parsed monitoring data transmitted by the central database, extracts a fault feature from the received monitoring data to obtain eigenvectors, and transmits the extracted eigenvectors to a feature database. Further, the data preprocessing module extracts a fault feature from the received data through wavelet packet decomposition to obtain eigenvectors, and then reduces a dimension of the extracted eigenvectors through kernel principal component analysis to obtain dimension-reduced eigenvectors. A wavelet packet algorithm may perform multi-layered band division on a signal in a full band. Therefore, completeness of fault feature extraction is relatively high. Optionally, to reduce computing complexity of a fault diagnosis classifier and improve accuracy of fault separation, a radial basis-kernel principal component analysis algorithm may be used to select a feature of and reduce a dimension of the extracted eigenvectors. Optionally, the data preprocessing module receives real-time data directly uploaded by the vehicle.

Optionally, the eigenvectors obtained through the foregoing processing may be directly transmitted to a fault diagnosis module for fault diagnosis and positioning.

S400: The feature database receives the eigenvectors transmitted by the data preprocessing module, and structurally stores and manages the received eigenvector data based on classification. For details, refer to the descriptions of the foregoing embodiments, and details are not described herein again. Further, a feature data database transmits the eigenvectors to the fault diagnosis module. It should be noted that the feature database is not a necessary module. A function of the module is to better manage the eigenvectors.

Figure 8:
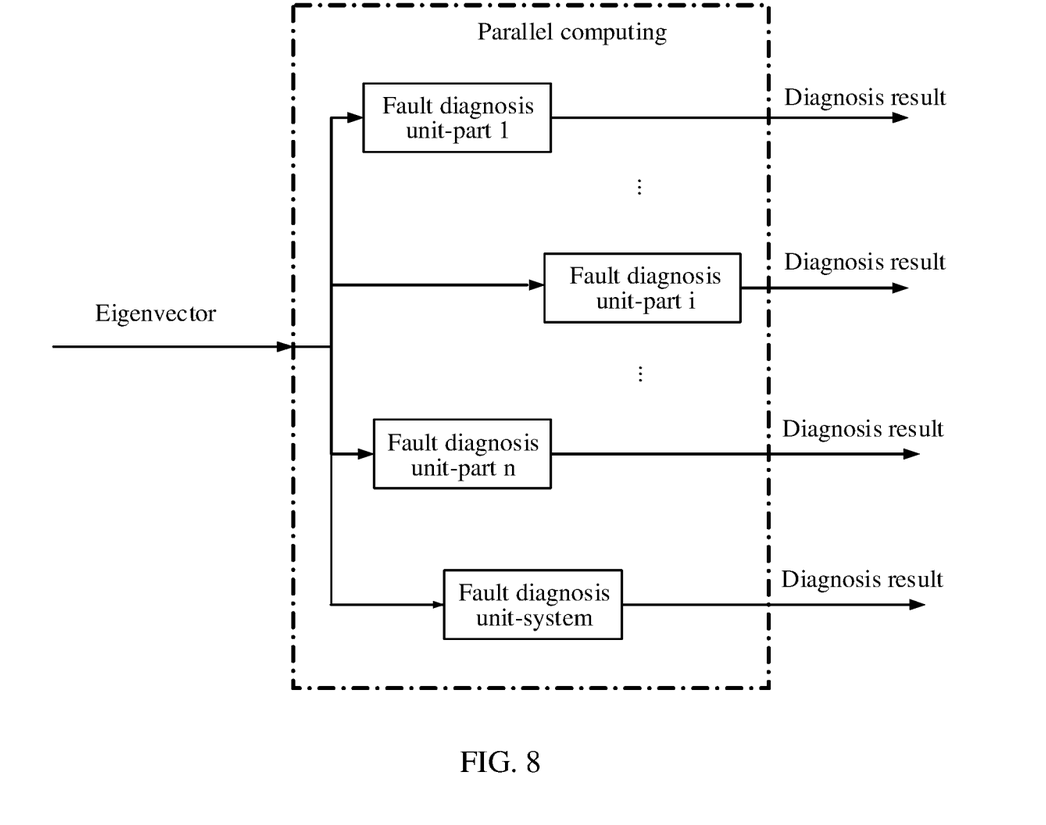
FIG. 8 is a schematic diagram of parallel computing according to an embodiment of the present disclosure.

S500: The fault diagnosis module receives the eigenvectors transmitted by the feature database, and diagnoses and positions a fault in real time based on a machine learning algorithm. Optionally, the machine learning algorithm is a support vector machine algorithm based on a DDAG. As shown in FIG. 8, optionally, the fault diagnosis module includes one or more fault diagnosis units. The fault diagnosis unit may be configured to correspond to a part/functional system, and perform parallel computing on the input eigenvectors based on part/functional system division to obtain diagnosis results. The parallel computing can shorten a fault diagnosis time and improve fault diagnosis accuracy. A fault diagnosis unit that corresponds to the part may perform fault diagnosis and positioning on the corresponding part and an internal element of the fault diagnosis unit; a fault diagnosis unit that corresponds to the functional system may perform fault diagnosis and positioning on an entire system or a functional system, such that wrong determining caused by an effect of a data transfer process on diagnosis can be avoided.

Figure 9:
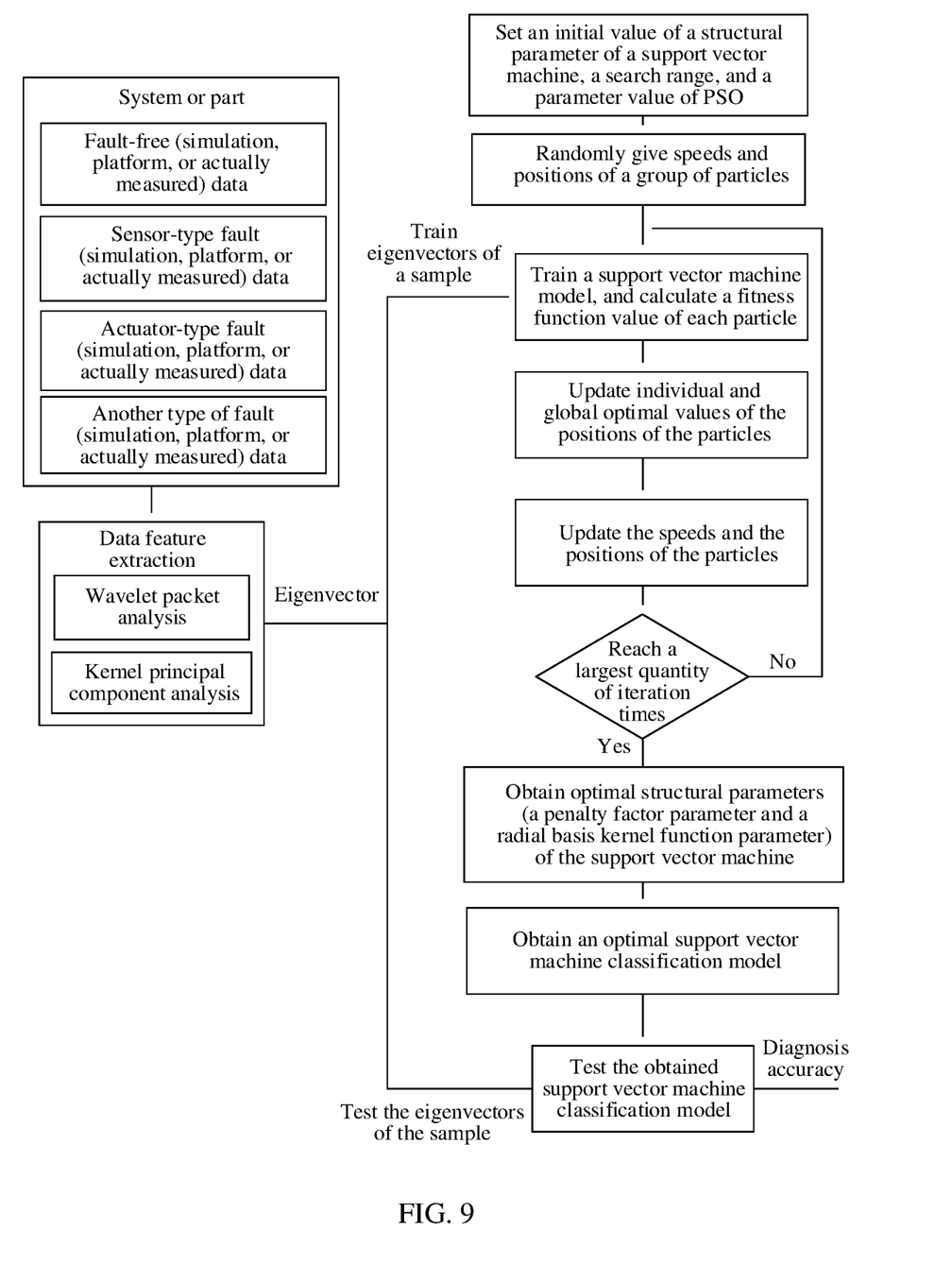
FIG. 9 is a flowchart of an offline training and fault classification model testing method according to an embodiment of the present disclosure.

Further, the fault diagnosis based on a support vector machine needs to construct a fault classifier offline, namely, a support vector machine classification model. When the support vector machine model is trained, a particle swarm optimization PSO algorithm is used to optimize a penalty factor parameter and a radial basis kernel function parameter of the support vector machine, to improve fault diagnosis accuracy. The following provides an offline training and fault classification model testing method. As shown in FIG. 9, steps are as follows.

(1) Data when different faults occur in different parts are collected for a vehicle power system or a key part such as an engine, a drive motor, a high-voltage battery system, an inverter, a direct current-direct current (DCDC), an OBC, a self-driving system, or an assistant driving system based on a sensor fault, an actuator fault, and another fault through simulation, a platform, or a real road test.

(2) Data feature extraction and dimension reduction processing are performed on the collected data using wavelet packet and kernel principal component algorithms, and different eigenvectors are finally output.

(3) The support vector machine is used to train eigenvectors of different faults, and PSO is used to optimize structural parameters of the support vector machine such as a penalty factor parameter and a radial basis kernel function parameter.

(4) An initial value of the structural parameter of the support vector machine, a search range, and a parameter value of PSO are set.

(5) Speeds and positions of a group of particles are randomly given.

(6) A support vector machine classification model is trained, and a fitness function value of each particle is calculated.

(7) Individual and global optimal values of the positions of the particles are updated.

(8) The speeds and the positions of the particles are updated.

(9) Whether a largest quantity of iteration times is reached is determined, and if the largest quantity of iteration times is reached, optimal structural parameters of the support vector machine, namely, a penalty factor parameter and a radial basis kernel function parameter are obtained.

(10) An optimal support vector machine classification model is obtained.

(11) Test data is used to test the obtained support vector machine classification model, and fault diagnosis accuracy is output, to determine accuracy of the classification model; and the tested support vector machine classification model is used for online real-time fault diagnosis.

This embodiment of the present disclosure provides a cloud-based fault diagnosis method. Based on the method, fault diagnosis is performed in parallel on eigenvectors of different parts/systems based on a support vector machine algorithm, such that a diagnosis time can be shortened, and a data transfer effect can be avoided to improve fault diagnosis accuracy.

Optionally, S600: The fault diagnosis module transmits a diagnosis result to the central database, the feature database, and a fault level determining module. Further, the central database and the feature database receive the diagnosis result to manage corresponding data based on classification using the diagnosis result as a label. For specific management based on the classification, refer to the foregoing embodiments, and details are not described herein again.

Optionally, S700: The fault level determining module determines a level of the received diagnosis result, where for specific level division, refer to the descriptions of the foregoing embodiments, and details are not described herein again; and further transmits the diagnosis result whose level is determined to a system degrading decision machine and a fault statistics collection module.

Optionally, S800: The fault statistics collection module collects statistics on data of the received diagnosis result. For specific statistics collection work, refer to the descriptions of the foregoing embodiments, and details are not described herein again. Further, the fault statistics collection module sends the statistical data to a manufacturer, a service provider, or the like, to improve a product and/or a service.

Figure 10:
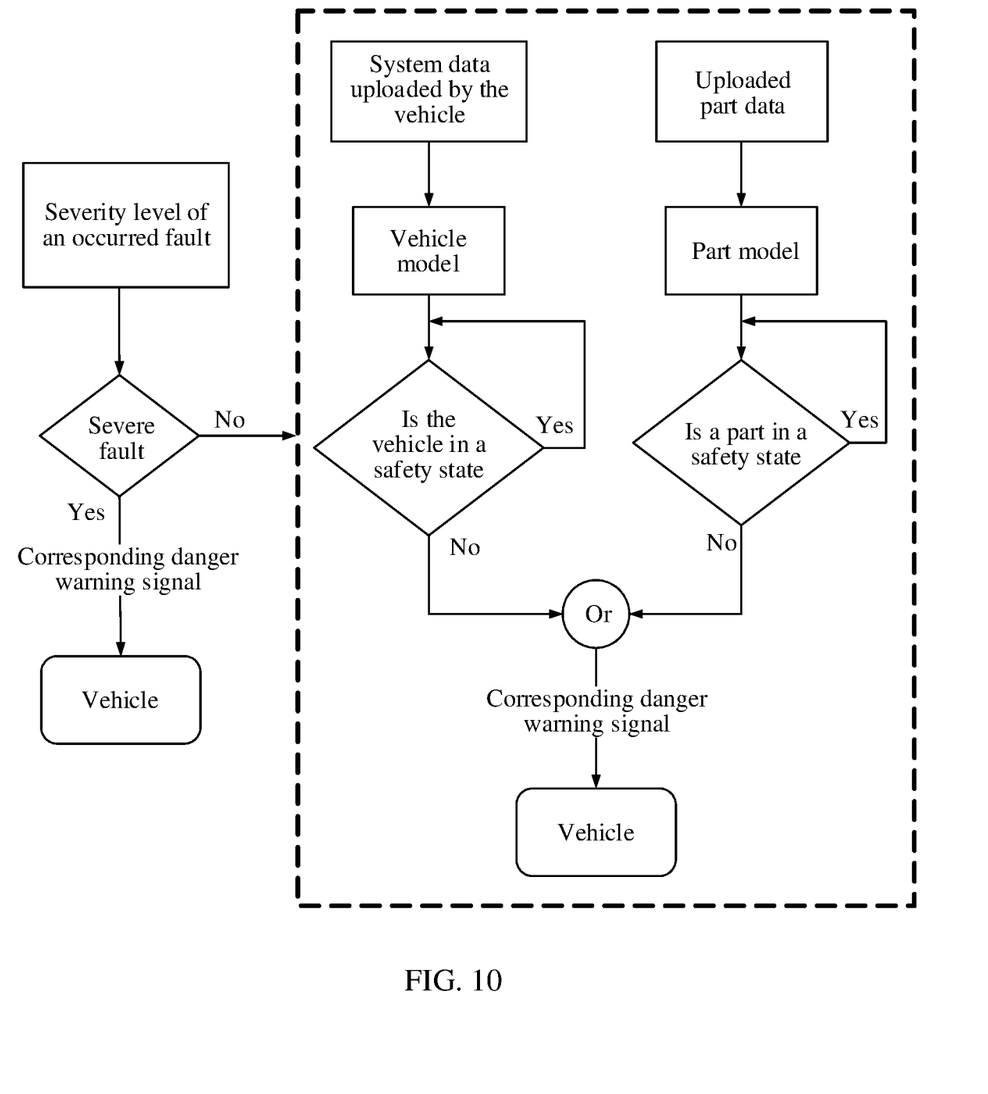
FIG. 10 is a flowchart of an internal decision method for a system degrading decision machine according to an embodiment of the present disclosure.

Optionally, S900: The system degrading decision machine receives the diagnosis result that is transmitted by the fault level determining module and whose level is determined, and makes, based on the result output by the fault level determining module, a decision about whether to send a corresponding danger warning signal to a vehicle. An internal decision and danger warning signal sending control process of the system degrading decision machine is shown in FIG. 10, and details are as follows.

(1) The system degrading decision machine makes a decision based on the result output by the fault level determining module. If a diagnosed fault is determined by the fault level determining module as a fault of a severity level, the system degrading decision machine directly sends the corresponding danger warning signal to the vehicle. Optionally, the danger warning signal reminds the vehicle that a severe fault is occurring, or/and requests to urgently process the severe fault. Optionally, the fault of the severity level means that if the fault occurs, the vehicle is likely out of control, and life safety of a driver is endangered. For example, if a brake pedal of the vehicle has a fault, brake performance of the vehicle cannot be ensured, and the fault can be classified as a most severe fault.

(2) If an occurred fault is determined by the fault level determining module as a fault of a non-severity level, the system degrading decision machine performs comprehensive determining based on real-time data uploaded by the vehicle.

On one hand, vehicle system data uploaded by the vehicle is input into a vehicle model, to determine whether the vehicle is in a safety state; and on the other hand, uploaded part data is input into a corresponding part model, to determine whether a part is in an expected safety state. Further, if the vehicle or the part is determined to be in a critical danger state, the system degrading decision machine sends a corresponding danger warning signal to the vehicle. The vehicle model and the part model may be constructed using a mathematical formula, or may be trained using an intelligent algorithm such as an audit network. In specific implementation, a parameter value reflecting a system safety state may be calculated based on a measured input/output signal of a system (a vehicle or a part) and a model of the system. If the parameter value exceeds an expected safety range, the system degrading decision machine determines that the vehicle in this case exceeds the expected safety state, and sends a corresponding system danger warning signal to the vehicle, to analyze a safety state of the vehicle in real time, and ensure safe driving of the vehicle.

Figure 11:
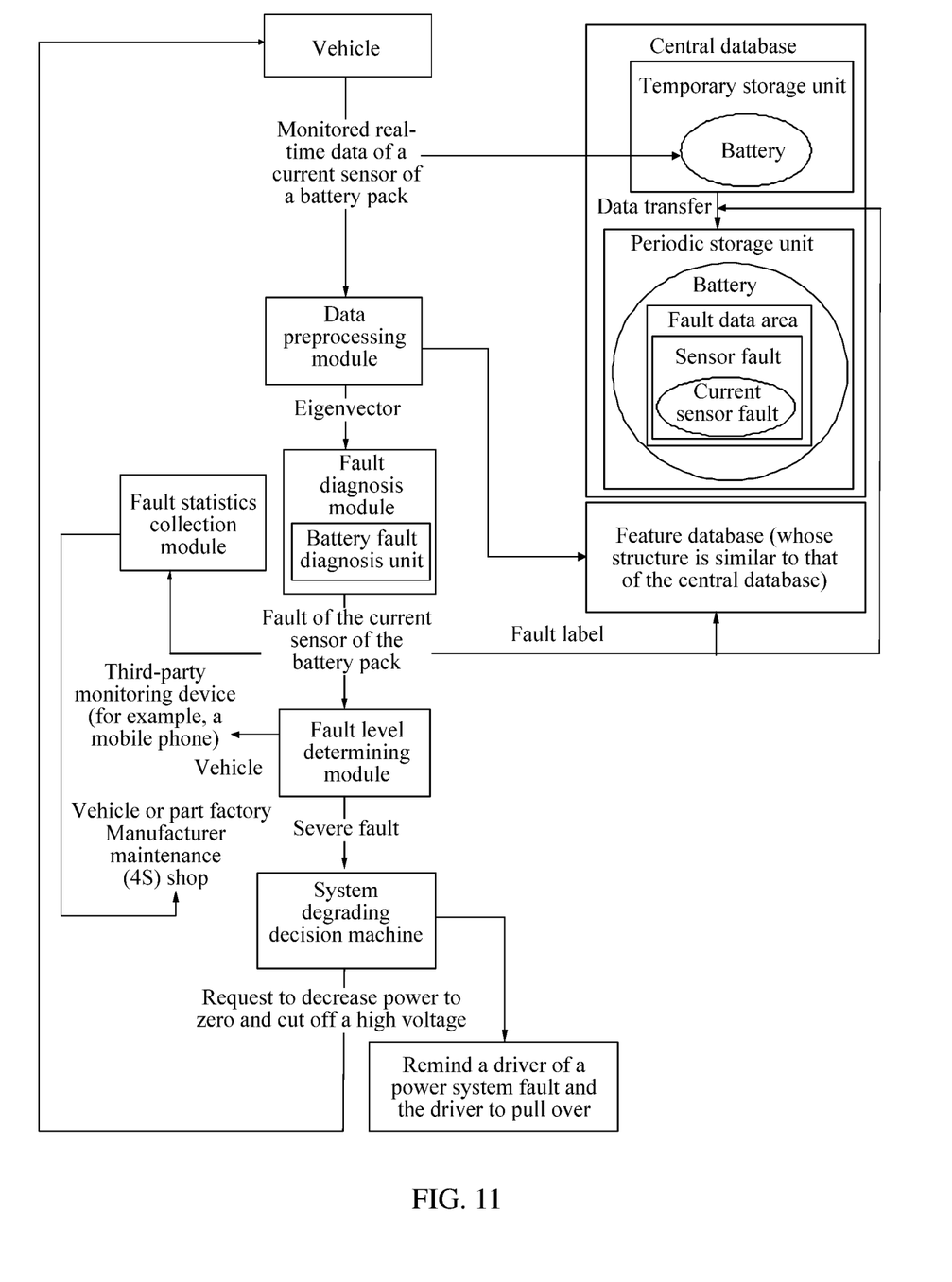
FIG. 11 is a flowchart of a fault diagnosis method for a current sensor of a battery pack according to an embodiment of the present disclosure.

The following uses a fault of a current sensor of a battery pack as an example, and describes a fault diagnosis and positioning process in detail. As shown in FIG. 11, an implementation process is as follows.

(1) A vehicle transmits monitored real-time data related to the current sensor of the battery pack to a temporary storage unit of a central database and a data preprocessing module.

(2) The data preprocessing module performs a feature extraction operation on the received data, sends extracted eigenvectors to a fault diagnosis module, and further sends the eigenvectors to a battery fault diagnosis unit. In addition, the data preprocessing module further stores the eigenvectors into a feature database. For a structure and a storage manner of the feature database, refer to the central database. An eigenvector related to a battery is stored into a battery area of the feature database.

(3) The battery fault diagnosis unit determines that the current sensor of the battery pack has a fault, and sends the diagnosis result to a fault statistics collection module, a fault level determining module, the central database, and the feature database.

(4) In this case, the central database uses the fault of the current sensor of the battery pack as a fault label, and transfers real-time data that is related to the battery and that is stored in the temporary storage unit to a periodic storage unit-battery area-fault data area-sensor fault area-current sensor fault area. The feature database also uses a similar method to transfer eigenvectors of the temporary storage unit to the periodic storage unit.

(5) In addition, the fault diagnosis result is also sent to a vehicle and a third-party monitoring device (for example, a mobile phone).

(6) In addition, the fault statistics collection module collects statistics on a probability of occurrence of the fault of the current sensor of the battery pack, and sends a result to a vehicle or part factory, and a manufacturer maintenance (4S) shop.

(7) In addition, a fault level determining module determines whether the fault is a severe fault, and sends the diagnosis result to a system degrading decision machine if the fault is determined as a severe fault.

(8) The degrading decision machine makes a degrading command decision based on the severe fault, and sends a corresponding danger warning signal to a VCU of a vehicle, to request to decrease power to zero and cut off a high voltage; and remind a driver of occurrence of a power system fault and the driver that the driver needs to pull over.

In the fault diagnosis method for the current sensor of the battery pack provided in this embodiment of the present disclosure, monitoring data of the current sensor of the battery pack is extracted, and then eigenvectors are stored to a corresponding classification storage area. A battery fault diagnosis unit determines, based on the eigenvectors, that the current sensor of the battery pack has a fault, such that an effect of monitoring data of another part/system on the monitoring data of the current sensor of the battery pack can be avoided, and fault diagnosis accuracy can be improved.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A cloud-based vehicle fault diagnosis method, comprising:
   receiving monitoring data of a vehicle, wherein the monitoring data comprises monitored data of a working status of either a part of the vehicle or a functional system of the vehicle;
   extracting first eigenvectors from the monitoring data, wherein the first eigenvectors are a set of numbers representing the monitoring data;
   classifying the first eigenvectors as classified eigenvectors using, as a first label, either the part of the vehicle or the functional system of the vehicle;
   storing, after the classifying, the classified eigenvectors as stored eigenvectors;
   performing in parallel, based on a support vector machine algorithm, fault diagnosis on the vehicle using the stored eigenvectorsto obtain a fault, wherein performing the fault diagnosis comprises:
      constructing a fault classifier based on a decision directed acyclic graph (DDAG); and
      calculating, according to the fault classifier based on the DDAG, a diagnosis result of the stored eigenvectors in parallel based on the classified eigenvectors, wherein the diagnosis result comprises at least a position at which the fault occurs;
   determining, based on the fault diagnosis, a severity level of the fault; and
   sending, after determining the severity level of the fault; and
   sending, after determining the severity level of fault, a danger warning signal to the vehicle when the severity level of the fault endangers normal driving of the vehicle, wherein the danger warning signal instructs the vehicle to take a fault countermeasure.

2. The cloud-based vehicle fault diagnosis method of claim 1, wherein before extracting the first eigenvectors from the monitoring data, the cloud-based vehicle fault diagnosis method further comprises:
   parsing the monitoring data to obtain parsed monitoring data;
   classifying the parsed monitoring data as classified parsed monitoring data using, as a second label, either the part of the vehicle or the functional system of the vehicle; and
   storing, after classifying the parsed monitoring data, the classified parsed monitoring data wherein the second label corresponds to the first label, and wherein extracting the first eigenvectors of the monitoring data from the monitoring data comprises extracting second eigenvectors of the parsed monitoring data from the parsed monitoring data.

3. The cloud-based vehicle fault diagnosis method of claim 1, wherein extracting the first eigenvectors from the monitoring data comprises extracting the first eigenvectors from the monitoring data using wavelet packet decomposition.

4. The cloud-based vehicle fault diagnosis method of claim 3, wherein before storing the classified eigenvectors as stored eigenvectors, the cloud- based vehicle fault diagnosis method further comprises:
   reducing a dimension of the classified eigenvectors through kernel principal component analysis to obtain dimension-reduced eigenvectors, and wherein storing the classified eigenvectors comprises:
      classifying the dimension-reduced eigenvectors as classified dimension- reduced eigenvectors using, as a third label, either the part of the vehicle or the functional system of the vehicle; and
      storing, after classifying the dimension-reduced eigenvectors, the classified dimension-reduced eigenvectors, and
   wherein performing, based on the support vector machine algorithm, the fault diagnosis on the vehicle using the stored eigenvectors comprises performing, based on the support vector machine algorithm, fault diagnosis on the classified dimension-reduced eigenvectors.

5. The cloud-based vehicle fault diagnosis method of claim 1, further comprising determining a severity level of a fault, wherein the fault diagnosis indicates the fault, and wherein the severity level comprises a severe fault, a moderate fault, or a general fault.

6. The cloud-based vehicle fault diagnosis method of claim 5, further comprising determining the severity level is the severe fault, and wherein the danger warning signal notifies the vehicle that the severe fault that endangers mormal driving of the vehicle is occurring.

7. A cloud-based vehicle fault diagnosis apparatus comprising:
a microcomputer comprising instructions, which when executed by the microcomputer, causes the microcomputer to be configured to:
receive monitoring data of a vehicle, wherein the monitoring data comprises monitored data of a working status of either a part of the vehicle or a functional system of the vehicle;
extract first eigenvectors from the monitoring data, wherein the first eigenvectors are a set of numbers representing the monitoring data; and
classify the first eigenvectors as classified eigenvectors using, as a first label, either the part of the vehicle or the functional system of the vehicle; and
a feature database coupled to the microcomputer and configured to store, based on classification of the first eigenvectors, the classified eigenvectors as stored eigenvectors,
wherein the microcomputer is further configured to:
perform in parallel, based on a support vector machine algorithm, fault diagnosis on the vehicle using the stored eigenvectors to obtain a fault, wherein performing the fault diagnosis comprises:
constructing a fault classifier based on a decision directed acyclic graph (DDAG); and
calculating, according to the fault classifier based on the DDAG, a diagnosis result of the stored eigenvectors in parallel based on the classified eigenvectors, wherein the diagnosis result comprises at least a position at which the fault occurs;
determine, based on the fault diagnosis, a severity level of the fault; and send, after determining the severity level of the fault, a danger warning signal to the vehicle when the severity level of the fault endangers normal driving of the vehicle, wherein the danger warning signal instructs the vehicle to take a fault countermeasure.

8. The cloud-based vehicle fault diagnosis apparatus of claim 7, wherein the cloud-based vehicle fault diagnosis apparatus further comprises a central database coupled to the microcomputer and the feature database, and wherein the central database is configured to:
parse the monitoring data to obtain parsed monitoring data;
classify the parsed monitoring data as classified parsed monitoring data using, as a second label, either the part of the vehicle or the functional system of the vehicle; and
store, after classification of the parsed monitoring data, the classified parsed monitoring data, wherein the second label corresponds to the first label,
wherein the microcomputer is further configured to extract second eigenvectors of the parsed monitoring data from the parsed monitoring data.

9. The cloud-based vehicle fault diagnosis apparatus of claim 7, wherein the instructions further cause the microcomputer to be configured to extract the first eigenvectors from the monitoring data using wavelet packet decomposition.

10. The cloud-based vehicle fault diagnosis apparatus of claim 9, wherein the instructions further cause the microcomputer to be configured to:
reduce a dimension of the classified eigenvectors through kernel principal component analysis to obtain dimension-reduced eigenvectors; and
perform, based on the support vector machine algorithm, fault diagnosis on the dimension-reduced eigenvectors, and
wherein the feature database is configured to:
classify the dimension-reduced eigenvectors as classified dimension-reduced eigenvectors using, as a third label, either the part of the vehicle or the functional system of the vehicle; and
store, after the classification of the dimension-reduced eigenvectors, the classified dimension-reduced eigenvectors.

11. The cloud-based vehicle fault diagnosis apparatus of claim 7, wherein the instructions further cause the microcomputer to be configured to determine a severity level of a fault, wherein the fault diagnosis indicates the fault, and wherein the severity level comprises a severe fault, a moderate fault, and a general fault.

12. The cloud-based vehicle fault diagnosis apparatus of claim 11, wherein the instructions further cause the microcomputer to be configured to further determine the severity level is the severe fault, and wherein danger warning signal notifies the vehicle during operation of the vehicle that the severe fault endangers normal driving of the vehicle is occurring.

13. A cloud-based vehicle fault diagnosis system, comprising:
a vehicle; and
a cloud-based vehicle fault diagnosis apparatus coupled to the vehicle and comprising:
a microcomputer, wherein the microcomputer comprises instructions which when executed by the microcomputer, causes the microcomputer to be configured to:
receive monitoring data of the vehicle, wherein the monitoring data comprises monitored data of a working status of either a part of the vehicle or a functional system of the vehicle;
extract first eigenvectors from the monitoring data, wherein the first eigenvectors are a set of numbers representing the monitoring data; and
classify the first eigenvectors as classified eigenvectors using, as a first label, either the part of the vehicle or the functional system of the vehicle; and
a feature database coupled to the microcomputer and configured to store, based on classification of the first eigenvectors, the classified eigenvectors as stored eigenvectors, and wherein the microcomputer is further configured to:
perform in parallel, based on a support vector machine algorithm, fault diagnosis on the vehicle using the stored eigenvectors to obtain a fault, wherein performing the fault diagnosis comprises:
constructing a fault classifier based on a decision directed acyclic graph (DDAG); and
calculating, according to the fault classifier based on the DDAG, a diagnosis result of the stored eigenvectors in parallel based on the classified eigenvectors, wherein the diagnosis result comprises at least a position at which the fault occurs;
determine, based on the fault diagnosis, a severity level of the fault; and
send, after determining the severity level of the fault, a danger warning signal to the vehicle when the severity level of the fault endangers normal driving of the vehicle, wherein the vehicle takes a fault countermeasure based on the danger warning signal.

14. The cloud-based vehicle fault diagnosis system of claim 13, wherein the instructions further cause the microcomputer to be configured to send the danger warning signal to the vehicle when a fault is diagnosed as a severe fault, and wherein the danger warning signal notifies the vehicle during real-time operation of the vehicle that the severe fault endangers normal driving of the vehicle.

15. The cloud-based vehicle fault diagnosis system of claim 13, wherein the instructions further cause the microcomputer to be configured to extract the first eigenvectors from the monitoring data using wavelet packet decomposition.

16. The cloud-based vehicle fault diagnosis system of claim 13, wherein the instructions further cause the microcomputer to be configured to determine a severity level of a fault based on the fault diagnosis, and wherein the fault diagnosis indicates the fault.

17. The cloud-based vehicle fault diagnosis system of claim 16, wherein the instructions further cause the microcomputer to be configured to:
reduce a dimension of the classified eigenvectors through kernel principal component analysis to obtain dimension-reduced eigenvectors; and
perform, based on the support vector machine algorithm, the fault diagnosis on the dimension-reduced eigenvectors,
wherein the feature database is configured to:
classify the dimension-reduced eigenvectors as classified dimension-reduced eigenvectors using, as a third label, either the part of the vehicle or the functional system of the vehicle; and
store, after classification of the dimension-reduced eigenvectors, the classified dimension-reduced eigenvectors.

18. The cloud-based vehicle fault diagnosis system of claim 16, wherein the severity level comprises a severe fault, a moderate fault, or a general fault.

19. The cloud-based vehicle fault diagnosis system of claim 15, wherein the cloud-based vehicle fault diagnosis apparatus further comprises a central database coupled to the microcomputer and the vehicle, and wherein the central database is configured to:
parse the monitoring data to obtain parsed monitoring data;
classify the parsed monitoring data as classified parsed monitoring data using, as a second label, either the part of the vehicle or the functional system of the vehicle; and
store, after classification of the parsed monitoring data, the classified parsed monitoring data, wherein the second label corresponds to the first label, and wherein the microcomputer is further configured to extract second eigenvectors of the parsed monitoring data from the parsed monitoring data.

* * * * *

UNITED STATES PATENT AND TRADEMARK OFFICE
CERTIFICATE OF CORRECTION

PATENT NO. : 11,468,715 B2
APPLICATION NO. : 16/510289
DATED : October 11, 2022
INVENTOR(S) : Zhentong Liu, Yongsheng Zhang and Wei Zhang It is certified that error appears in the above-identified patent and that said Letters Patent is hereby corrected as shown below:

In the Claims

Claim 1, Column 12, Line 4: "storing, after the classifying, the" should read "storing, based on classifying the first eigenvectors, the"

Claim 1, Column 12, Line 8: "stored eigenvectorsto obtain" should read "stored eigenvectors to obtain"

Claim 1, Column 12, Lines 19 and 20: should be deleted

Claim 13, Column 14, Line 61: "eigenvectors to obtain a fault," should read "eigenvectors,"

Signed and Sealed this
Thirteenth Day of December, 2022

Katherine Kelly Vidal
*Director of the United States Patent and Trademark Office*